United States Patent [19]
Yamashita et al.

[11] Patent Number: 5,808,693
[45] Date of Patent: Sep. 15, 1998

[54] VIDEO DISPLAY APPARATUS WITH POWER SAVING MODES

[75] Inventors: Hiroshi Yamashita; Yasunori Mori, both of Kanagawa; Masanobu Kimoto, Tokyo, all of Japan

[73] Assignee: Sony Corporation, Tokyo, Japan

[21] Appl. No.: 743,810

[22] Filed: Nov. 6, 1996

[30] Foreign Application Priority Data

Nov. 7, 1995 [JP] Japan .................................. 7-288834

[51] Int. Cl.$^6$ .............................. H04N 3/27; H04N 5/63
[52] U.S. Cl. ...................... 348/554; 348/730; 348/563; 348/706; 345/211
[58] Field of Search ................................. 348/554, 555, 348/557, 558, 563, 705, 706, 730; 345/211, 213; H04N 5/63, 5/268, 5/445, 3/27

[56] References Cited

U.S. PATENT DOCUMENTS 5,270,821 12/1993 Samuels .
5,389,952 2/1995 Kikinis .
5,521,647 5/1996 Hyakutake ............................ 348/571
5,532,719 7/1996 Kikinis ................................. 345/211

*Primary Examiner*—Sherrie Hsia
*Attorney, Agent, or Firm*—Jay H. Maioli

[57] ABSTRACT

A video display apparatus capable of receiving multiple video input signals and of reducing its power consumption when each of those signals becomes inactive. Power consumption is reduced by selecting from a number of power saving modes. Each power saving mode has an associated recovery time as well as an associated amount of power savings. Recovery time is minimized by determining which of the video input signals is most likely to become active first, assigning a high priority to that signal and selecting a power saving mode based on characteristics of that signal. The likelihood of reactivation of a signal is determined by detecting the absence of normal vertical and/or horizontal synchronization signals.

13 Claims, 3 Drawing Sheets

VIDEO DISPLAY APPARATUS WITH POWER SAVING MODES

BACKGROUND OF THE INVENTION

The present invention relates generally to video display apparatus and in particular to a video display apparatus that can switch to a power saving mode in response to aspects of the video input signal present at its input.

In conventional video display apparatus, video images represented by video signals present at video input terminals are displayed on a color cathode-ray tube (color CRT). When certain components of the video signal are absent, portions of the display device are shut down and the system enters one of a plurality of power saving modes.

After the apparatus enters a power saving mode, when a normal video signal is subsequently supplied to a video input terminal, the apparatus resumes a normal operating mode. The delay between restoration of a normal video signal and resumption of the normal operating mode is called the recovery time. Each of the plurality of power saving modes is associated with a different recovery time, and so restoration from each power saving mode results in a different level of system performance.

Conventional color CRT displays have four modes of operation. These are normal mode, standby mode, suspend mode and active-off mode. The amount of power consumed and the amount of recovery time required to resume normal operation for each of these modes depend on whether the color CRT heater supply, the color CRT main power supply or both are energized. Table 1 summarizes power saving modes in terms of the state of the power supplies and the amount of recovery time required to resume normal operation.

TABLE 1

| Mode | Heater power supply | Main power supply | Recovery time |
| --- | --- | --- | --- |
| Normal mode | ON | ON | None |
| Standby mode | ON | ON | Short (e.g., 1 second) |
| Suspend mode | ON | OFF | Long (e.g., 3 seconds) |
| Active-off mode | OFF | OFF | Longest (e.g., 10 seconds) |

In the normal mode both horizontal and vertical sync (synchronizing) signals are supplied to the video signal input terminals and a picture is displayed on the display screen of the color CRT. Power is supplied by both a heater power supply to energize a heater of the color CRT and a main power supply to energize the deflection circuit of the color CRT. The display apparatus consumes the maximum amount of power in this mode and there is no associated recovery time.

When the horizontal sync signal is not present or where the supplied vertical or horizontal sync signals are outside of a predetermined range, the color CRT is placed in the standby mode. In the standby mode both the heater and the main power supply are turned on, however, the video signal is muted and no picture is displayed on the display screen of the color CRT. Power consumption in the standby mode is less than that in the normal mode. When the normal horizontal and vertical sync signals are again supplied to the video signal input terminal, a picture can be displayed on the color CRT in a short period of time, for example, about 1 second.

The suspend mode is selected when the signal supplied to the video signal input terminal has a horizontal sync signal but no vertical sync signal. In the suspend mode, the heater power supply remains on and the main power supply is turned off. Power consumption is reduced significantly from the normal mode since no power is supplied by the main power supply to the deflection circuit. Because the heater power supply remains energized, when the normal horizontal and vertical sync signals are once again supplied to the video input terminal the color CRT can be restored to the normal mode in a short period of time, for example, about 3 seconds.

When no signal is supplied to the video input terminals the apparatus is placed in the active-off mode. In the active-off mode, both the heater power supply and the main power supply are turned off and power consumption is much less than in the normal mode. Because the color CRT heater must be re-energized before an image can be displayed, however, when the normal horizontal and vertical sync signals are again supplied to the video signal input terminal, it takes a relatively long time, for example about 10 seconds for the color CRT to display an image.

Reduction of power consumption in video display devices as described above and shown in Table 1 is generally well known. Such a system is described in U.S. Pat. No. 5,389,952 (Kikinis) where synchronization signals supplied by a computer to a CRT Monitor are selectively disabled to cause the monitor to enter one of two power saving modes.

Further, it is also known that a video display apparatus can be made where a plurality of video signals from several sources are applied through separate video input terminals. Each of these signals may require a different scan frequency and each will therefor have different horizontal and/or vertical sync components. These signals are then applied to an output display device such as a color CRT. Such a system is described, for example, in U.S. Pat. No. 5,270,821 (Samuels) where a computer monitor provides synchronization signals to incoming video signal sources to keep displayed characters aligned despite variations in input signal frequencies.

When the conventional means of selecting a power saving mode based on the presence of horizontal and vertical sync signals is used in combination with a video display apparatus that receives video signals from sources that have dissimilar horizontal and vertical synchronization signals, however, the selection of the power saving mode may be unstable.

SUMMARY OF THE INVENTION

In view of the aforesaid problem, it is an object of the present invention to provide a video display apparatus that can be placed in a stable power saving mode based on synchronization signals of the input video signal.

A primary object of this invention is to provide a video display apparatus that can select one of a plurality of power saving modes based on the presence or absence of certain features of a video input signal. It is a further object of this invention to provide a video display apparatus with a plurality of video signal input terminals to which video signals from a computer or the like are supplied that can automatically and sequentially switch among the plurality of video signals and that also includes a power saving function to switch the apparatus into one of a plurality of power saving modes based on the state of the video signal inputs. It is a still further object of the present invention to provide a video display apparatus that can select one of a plurality of power saving modes based on features of a video input signal, and maintain that power saving mode in a stable manner.

According to a first aspect of the present invention, there is provided a video display apparatus with a plurality of power saving modes, each having a different power consumption level and recovery time. This apparatus comprises a plurality of input terminals for receiving video signals, a display means, a selecting means for connecting a video signal to the display means, a sync separation means, a detecting means for detecting the absence of a sync signal on the selected input terminal, a control means for controlling the selecting means, a prioritization means for determining the priority level to assign to each video signal and a power saving means to reduce the power consumption of the display device in the absence of sync signals on the highest priority signal.

According to a second aspect of the present invention, there is provided a cathode-ray tube monitor having at least two power saving modes of different power consumption levels and respective recovery times. This cathode-ray tube monitor is comprised of a main power supply for supplying power to the deflection coils of the cathode-ray tube, a heater power supply for supplying power to the heater of the cathode-ray tube, first and second input terminals to which video signals including vertical synchronization (V.SYNC) and horizontal synchronization (H.SYNC) signals are supplied, selector means for selecting one of the first and second input terminals, means for detecting V.SYNC and H.SYNC supplied from the selecting means, means for controlling the selection means, the controlling means changing the selection of the input terminals in the absence of a video signal having ordinary V.SYNC and H.SYNC at an input terminal that is selected, and power saving means for setting the video display apparatus in one of a plurality of power saving modes by controlling the power supply means depending upon the status of the detected V.SYNC and H.SYNC signals.

In accordance with a third aspect of the present invention, there is provided a method for setting a video display apparatus in a power saving mode, the video display apparatus having a plurality of input terminals to which video signals including V.SYNC and H.SYNC signals are supplied and having a plurality of power saving modes each having a different power consumption level and recovery time. This method is comprised of the steps of detecting V.SYNC and H.SYNC supplied to one of the input terminals, changing the selection of the input terminal to another of the input terminals in the absence of a video signal that has ordinary V.SYNC and H.SYNC signals, setting the video display apparatus in the full power mode when a video signal having ordinary V.SYNC and H.SYNC is supplied to at least one of the input terminals, detecting V.SYNC and H.SYNC at all of the input terminals when a video signal having ordinary V.SYNC and H.SYNC is not supplied to any of the input terminals, and setting the video display apparatus in one of the plurality of power saving modes.

According to the present invention, the power saving modes remain stable until a video signal with normal V.SYNC and H.SYNC signals is restored. When a normal video signal is supplied to one of a plurality of video signal input terminals, the power saving mode has been selected to allow a picture to be displayed in as short a period of time as possible while obtaining the greatest power savings.

DETAILED DESCRIPTION OF THE PREFERRED EMBODIMENT

A video display apparatus according to the present invention will be described with reference to the drawings.

Figure 1:
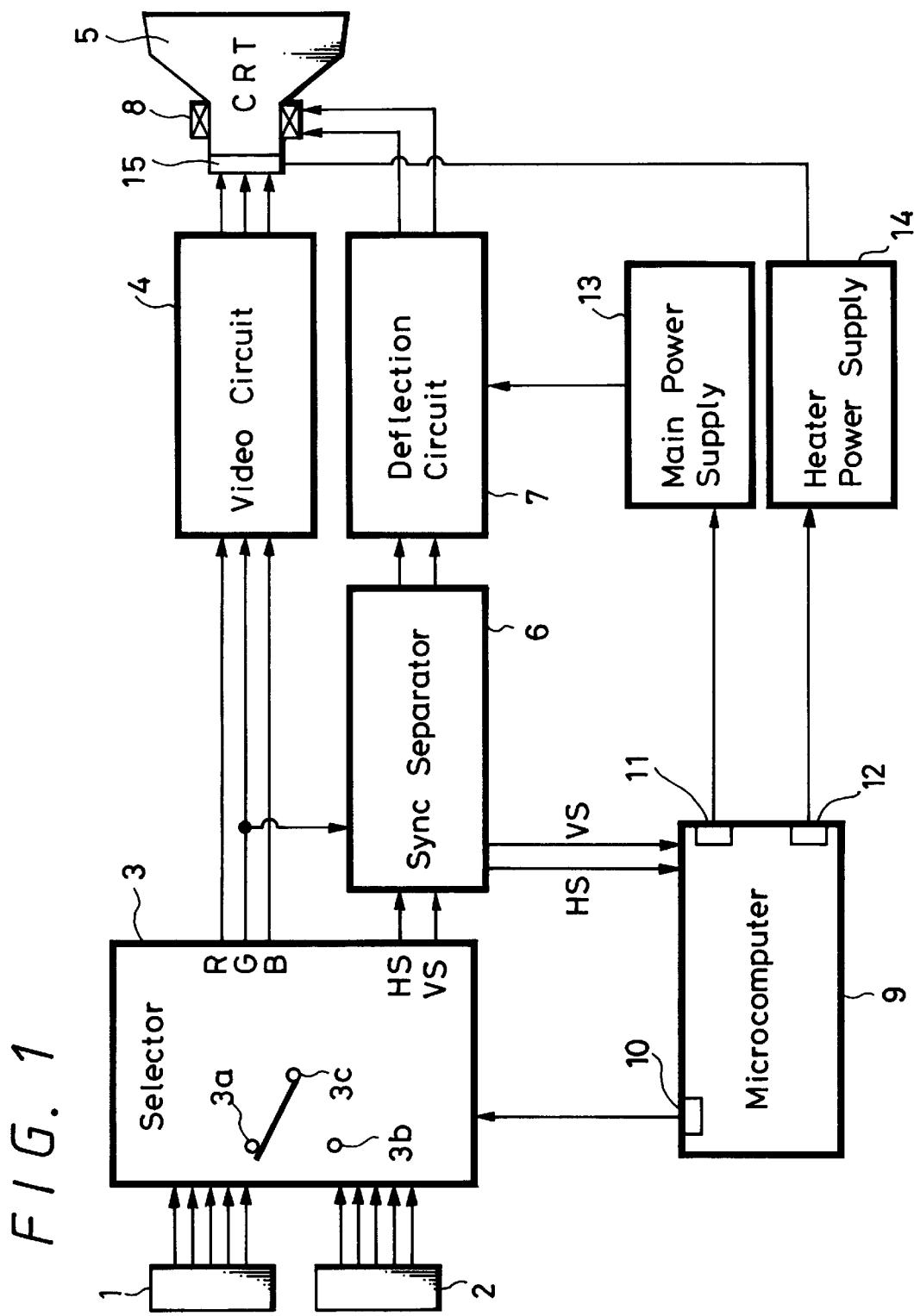
FIG. 1 is a block diagram showing a video display apparatus according to the present invention.

FIG. 1 of the accompanying drawings shows in block form a video display apparatus according to the present invention, wherein reference numerals 1 and 2 designate two video signal input terminals to which video signals from a computer (not shown), for example, are supplied. In this embodiment, video signal output terminals of the computer are connected to the two video signal input terminals 1 and 2.

The two video signal input terminals 1 and 2 are connected to fixed contacts 3a and 3b respectively of a selector 3. Selected red (R), green (G), and blue (B) video signals present at a movable contact 3c of the selector 3 are supplied through a video circuit 4 to a color CRT 5.

A horizontal sync signal HS and a vertical sync signal VS obtained at the movable contact 3c of the selector 3 are supplied to a sync separator 6. A decoding sync signal is ordinarily superimposed upon the green (G) video signal. In such systems only the green signal is supplied to the sync separator 6, as shown in FIG. 1.

The horizontal sync signal HS and the vertical sync signal VS from the sync separator 6 are supplied to a deflection circuit 7. The deflection circuit 7 generates a horizontal deflection signal and a vertical deflection signal. The horizontal deflection signal and the vertical deflection signal from the deflection circuit 7 are supplied to a deflection coil 8 of the color CRT 5.

The horizontal sync signal HS and the vertical sync signal VS from the sync separator 6 are also supplied to a microcomputer 9. The microcomputer 9 controls the switching of the movable contact 3c of the selector 3 via a signal supplied to an output port 10.

The microcomputer 9 controls a main power supply 13 via a signal supplied at an output port 11. The microcomputer 9 can turn the main power supply 13 on and off. The main power supply 13 supplies power to the deflection circuit 7.

The microcomputer 9 also controls a heater power supply 14 via a signal supplied at an output port 12 to turn the heater power supply 14 on and off. The heater power supply 14 supplies power to the heater 15 of the color CRT 5.

Figure 2:
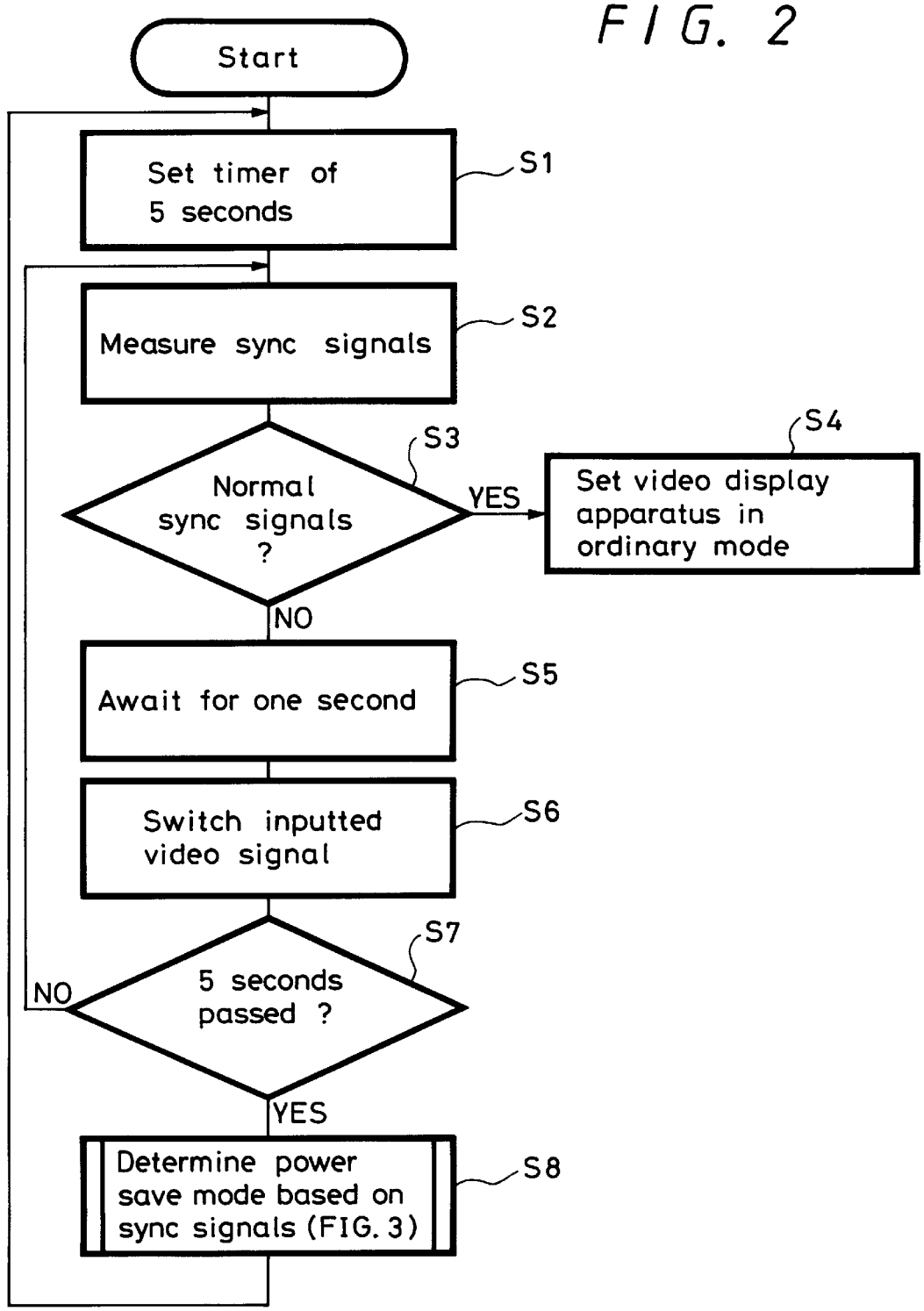
FIGS. 2 and 3 are flowcharts to which reference will be made in explaining the operation of the present invention.
Figure 3:
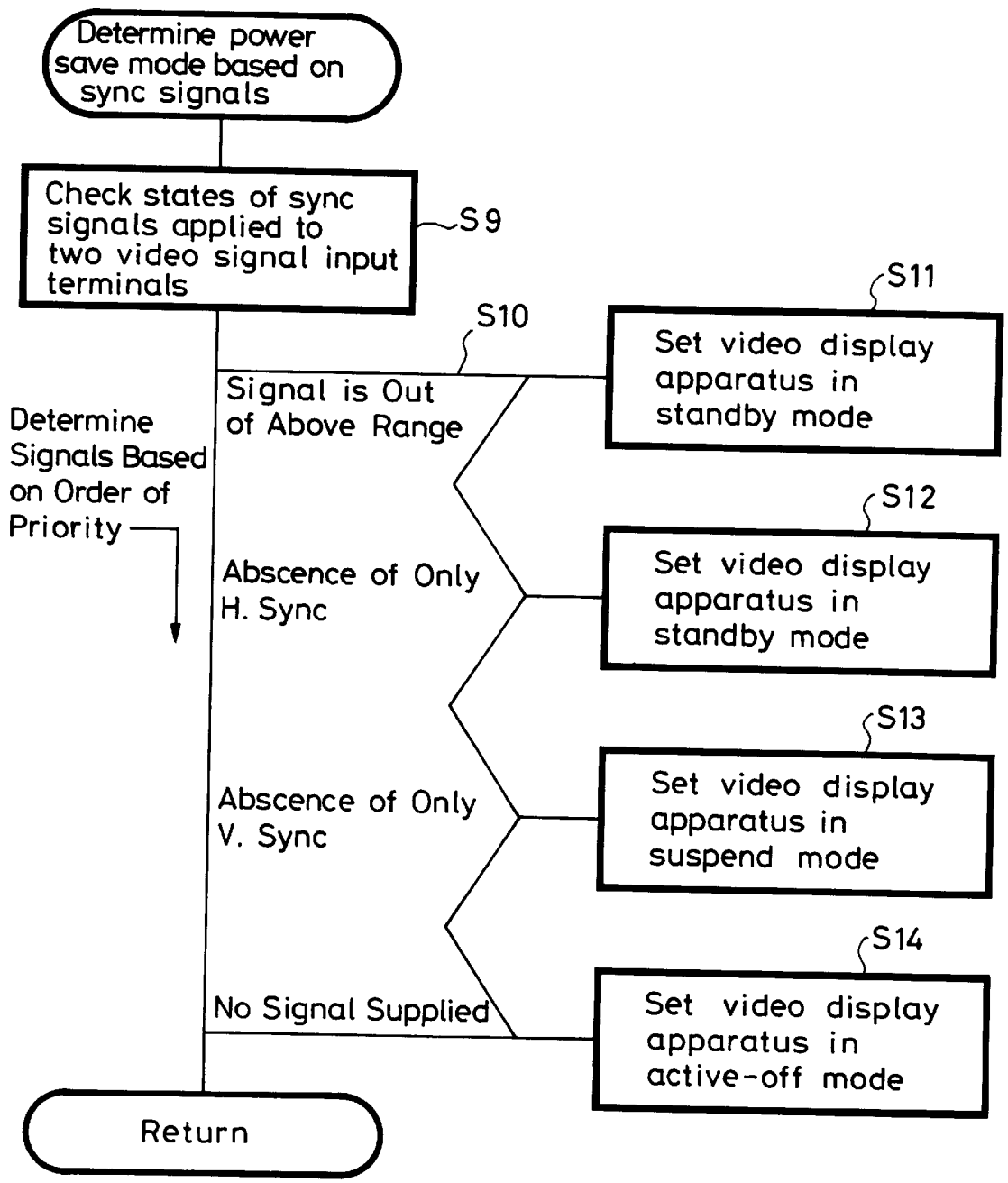

According to the present invention, the microcomputer 9 executes processing based on the flowcharts shown in FIGS. 2 and 3.

In the process shown in FIG. 2, following the start of operation, control goes to step S1, where a timer is set to 5 seconds.

At step S2 the sync signals obtained at the movable contact 3c of the selector 3 comprised of the horizontal sync signal HS and the vertical sync signal VS supplied to the video signal input terminal 1 are supplied through the sync separator 6 to the microcomputer 9. At step S3 a decision is made whether the horizontal sync signal HS and the vertical sync signal VS are normal sync signals. If the horizontal sync signal HS and the vertical sync signal VS are the normal sync signals (a YES at the decision step S3) then control goes to a step S4 where the video display apparatus is set to normal mode as shown in Table 1.

The movable contact 3c of the selector 3 is connected to the fixed contact 3a in response to the control signal from the output port 10 of the microcomputer 9. The main power supply 13 and the heater power supply 14 are turned on in response to the control signals from the output ports 11 and 12 of the microcomputer 9. The video signals from video signal input terminal 1 are supplied to the color CRT 5 and a picture is displayed.

If the horizontal sync signal HS and the vertical sync signal VS supplied to video signal input terminal 1 are not the normal sync signals a NO decision is returned at step S3. Control goes to step S5, where the process pauses for one second. Then, control goes to step S6, where the movable contact 3c of the selector 3 is switched to the fixed contact 3b in response to the control signal from the output port 10 of the microcomputer 9, whereby the signal from video signal input terminal 2 is supplied to the movable contact 3c.

At step S7 it is determined whether 5 seconds have elapsed since the timer was set in step S1. If 5 seconds have not elapsed (a NO at decision step S7) then control goes back to step S2. The horizontal sync signal HS and the vertical sync signal VS from the other video signal input terminal 2 are supplied through the sync separator 6 to the video display apparatus. At step S3 it is determined whether the horizontal sync signal HS and the vertical sync signal VS are normal sync signals. If the horizontal sync signal HS and the vertical sync signal VS are the normal sync signals (a YES at the decision step S3) then control goes to step S4 and the video display apparatus is set in normal mode as shown in Table 1.

The movable contact 3c of the selector 3 is connected to the fixed contact 3b in response to the control signal from the output port 10 of the microcomputer 9. The main power supply 13 and the heater power supply 14 are turned on in response to the control signals from the output ports 11 and 12. The video signals from the video signal input terminal 2 are supplied to the color CRT 5, and a picture representative of the video signals from terminal 2 is displayed.

If the horizontal sync signal HS and the vertical sync signal VS supplied to the video signal input terminal 2 are not normal sync signals (a NO at the decision step S3), then control goes to step S5. The process pauses for one second, and control goes to step S6. At step S6 the movable contact 3c of the selector 3 is connected to the fixed contact 3a, and the signal from the video signal input terminal 1 is supplied to the movable contact 3c.

According to the present invention, if the ordinary sync signals are not supplied to either video signal input terminals 1 or 2, steps S2, S3, S5 and S6 are repeated. The timer set in step S1 is checked at step S7 and if 5 seconds have elapsed (a YES decision at step S7) then control goes to step S8. At step S8 the appropriate power saving mode of the video display apparatus is selected based on the horizontal sync signal HS and the vertical sync signal VS present in the signal at video input terminal 1.

The process for determining the appropriate power save mode of the video display apparatus based on the sync signals at step S8 is carried out in accordance with a flowchart shown in FIG. 3.

Referring to FIG. 3, initially, at step S9 the sync signals supplied to the video input terminals 1 and 2 are checked.

The state of the sync portion of the signals present on video input terminals 1 and 2 determines the priority assigned to each of the signals. When the signal present at one terminal is found to have a higher priority than that at the other terminal, the signal with the higher priority is used to determine the appropriate power saving mode.

Signal priorities are determined based on the likelihood that a complete signal will soon be restored to that terminal. Thus, where the signal at a video input terminal has both a horizontal and a vertical sync portion, but one of these portions is out of range, then it is deemed likely that the full signal will be restored quickly, and that signal is given a high priority. Where neither a horizontal nor a vertical sync portion of the signal is present, it is deemed unlikely that a full signal will be restored to that terminal immediately, and that signal is given a lower priority. The order of signal priorities is shown in Table 2.

TABLE 2

| Horizontal sync signal | Vertical sync signal | Order of Priority |
| --- | --- | --- |
| Exists | Exists (but one of them is out of the above range) | 1 |
| None | Exists | 1 |
| Exists | None | 2 |
| None | None | 3 |

At step S10 the appropriate power saving mode is selected based on the state of the sync components of the signal at video input terminals 1 and 2 with the highest priority. If any one of the horizontal sync signal HS or vertical sync signal VS is out of its expected range, or if the horizontal sync signal HS is not detected, the video display apparatus is set in the standby mode at either step S11 or step S12. The states of the main power supply 13 and the heater power supply 14 in the standby mode are shown in Table 1.

In the standby mode, the main power supply 13 and the heater power supply 14 are turned on by the control signals at the output ports 11 and 12 of the microcomputer 9. When normal sync signals are again supplied to any one of the video signal input terminals 1 and 2, a picture can be displayed on the display screen of the color CRT 5 in a short period of time. The recovery time for the standby mode, as shown in Table 1, is about 1 second.

If it is determined in step S10 that one of the signals supplied to the two video signal input terminals 1 and 2 has no vertical sync signal VS and that the other signal is lower in order of priority or that both signals have no vertical sync signal VS, then control passes to step S13 and the video display apparatus is set in the suspend mode.

In this case, the main power supply 13 is turned off by the control signal obtained at the output port 11 of the microcomputer 9, while the heater power supply 14 remains energized by the control signal obtained at the output port 12 of the microcomputer 9.

When the normal sync signal is again supplied to any one of the video signal input terminals 1 and 2, a picture may be displayed on the color CRT 5 in a relatively short period of time since the color CRT 5 remains heated to its operating temperature. The recovery time from the suspend mode to the normal operating mode is about 3 seconds.

If it is determined in step S10 that no signal is supplied to either of the two video signal input terminals 1 and 2, then control passes to step S14 and the video display apparatus is placed in the active-off mode.

In this case, the main power supply 13 and the heater power supply 14 are each turned off by the control signals obtained at the output ports 11 and 12 of the microcomputer 9, respectively, as shown in Table 1. Power consumption is reduced significantly. When the normal sync signal is restored to any one of the video signal input terminals 1 and 2, power must be restored to both the main power supply 13 and the heater power supply 14 and the color CRT 5 must be heated to its operating temperature. This may take as long as 10 seconds, as shown in Table 1.

After the power save modes have been determined (at steps S11, S12, S13 or S14), control goes back to the step S1 of FIG. 2, and the process is repeated.

Power consumption is minimized because one of a plurality of power saving modes may be selected based on the performance requirements of the system. By selecting the characteristics of the video signals at video input terminals 1 and 2, a picture generating device, such as a computer, can reduce power minimally, if rapid picture restoration is required, and can reduce power consumption dramatically if a longer recovery time can be tolerated.

Further, according to this embodiment, the power saving mode selected remains stable since the mode is not switched each time the two video signal input terminals 1 and 2 are switched.

The present invention is described in terms of two video signal input terminals and four possible power saving modes, however, the present invention is not limited thereto. The present invention is applicable to video display apparatus which include three video signal input terminals or more. The present invention is also applicable to video display devices where other power saving modes are available.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A video display apparatus comprising:
   a plurality of input terminals for receiving a plurality of video signals;
   display means;
   selecting means connected to each of the plurality of input terminals and connected to the display means for selecting a video signal from the plurality of video signals and transferring that signal to the display means;
   sync separation means connected to the selecting means for separating synchronization signals from the selected video signal;
   detecting means connected to the sync separation means for detecting an absence of the synchronization signals;
   control means connected to the detecting means and the selecting means, whereby the selecting means is controlled to select another video signal from the plurality of video signals in response to the absence of the synchronization signals in the previously selected video signal detected by the detecting means;
   prioritization means connected to the detecting means and the control means for determining which of the plurality of video signals has a highest priority in response to the detected absence of the synchronization signals and for assigning a priority level to the highest priority video signal based on a likelihood that the highest priority signal will regain a synchronization signal in a predetermined period of time; and
   power saving means connected to the control means and to the display means whereby one of a plurality of power saving modes is selected in response to the absence of synchronization signals in the highest priority video signal determined by the prioritization means.

2. The video display apparatus according to claim 1 wherein the synchronization signals are a vertical synchronization signal and a horizontal synchronization signal.

3. The video display apparatus according to claim 1 wherein the selecting means periodically changes the selected video signal.

4. The video display apparatus according to claim 1 wherein the display means comprises:
   a cathode-ray tube;
   heater power supply means connected to the cathode-ray tube for heating the cathode-ray tube to its operating temperature;
   main power supply means connected to the cathode-ray tube for providing power to a deflecting coil of the cathode-ray tube; and
   wherein the power saving means comprises:
   heater power supply means switching means connected to the heater power supply means for energizing and de-energizing the heater power supply means;
   main power supply switching means connected to the main power supply means for energizing and de-energizing the main power supply means; and
   muting means connected to the selecting means for muting the selected video signal.

5. The video display apparatus according to claim 4 wherein the plurality of power saving modes includes a standby mode wherein the heater power supply switching means energizes the heater power supply means, the main power supply switching means energizes the main power supply means, and the muting means mutes the selected video signal.

6. The video display apparatus according to claim 5 wherein the plurality of power saving modes further includes an active-off mode wherein the heater power supply switching means de-energizes the heater power supply means and the main power supply switching means de-energizes the main power supply means.

7. The video display apparatus according to claim 6 wherein the plurality of power saving modes further includes a suspend mode wherein the heater power supply switching means energizes the heater power supply means and the main power supply switching means de-energizes the main power supply means.

8. A cathode-ray tube video monitor having at least two power saving modes of different power consumption levels and recovery times, comprising:
   a cathode-ray tube;
   a main power supply connected to the cathode-ray tube for supplying power to a deflection coil of the cathode-ray tube;
   a heater power supply for supplying power to a heater of the cathode-ray tube;
   first and second input terminals to which video signals including vertical synchronization signals and horizontal synchronization signals are supplied;
   selecting means connected to the first and second input terminals for selecting one of the first and second input terminals;
   detecting means connected to the selecting means for detecting a status of the vertical synchronization signals and the horizontal synchronization signals supplied from said selecting means;

controlling means connected to the selecting means for causing the selecting means to change the selection of the input terminals in the absence of a video signal having a predetermined vertical synchronization signal and horizontal synchronization signal at the selected input terminal; and power saving means connected to the main power supply and the heater power supply for setting the video monitor in one of the power saving modes by energizing or de-energizing the main power supply and the heater power supply depending upon the status of the detected vertical synchronization signal and horizontal synchronization signal.

9. Apparatus according to claim 8, in which said one of the power saving modes has a shortest recovery time.

10. Apparatus according to claim 9, in which the power saving modes include a standby mode wherein the heater power supply and the main power supply are energized and at least one of the video signals is muted.

11. Apparatus according to claim 10, in which the power saving modes include an active-off mode wherein the heater power supply and the main power supply are de-energized.

12. Apparatus according to claim 11, in which the power saving modes further include a suspend mode wherein the heater power supply energized and the main power supply is de-energized.

13. A method for reducing power consumption of a video display apparatus with at least two selectable input terminals respectively receiving a first and a second video signal, comprising the steps of:

selecting the first video signal on a first input terminal;

detecting an absence of a predetermined vertical or a predetermined horizontal synchronization signal in the first video signal;

assigning a priority level to the first video signal based on the absence of the predetermined vertical or horizontal synchronization signals;

selecting the second video signal on a second input terminal;

detecting an absence of a predetermined vertical or a predetermined horizontal synchronization signal in the second video signal;

assigning a priority level to the second video signal based on the absence of the predetermined horizontal or vertical synchronization signals; and selecting one of a plurality of power saving modes based on the priority levels assigned to the first or second video signals.

* * * * *